United States Patent Office 2,757,142
Patented July 31, 1956

2,757,142

METHOD OF IMPROVING HEAT EXCHANGER AQUEOUS PUMPING SYSTEMS AND COMPOSITIONS THEREFOR

John W. Ryznar, La Grange Park, Ill., assignor to National Aluminate Corporation, Chicago, Ill., a corporation of Delaware No Drawing. Application November 28, 1950,
Serial No. 198,030

8 Claims. (Cl. 252—73)

This invention relates to a method of improving heat exchanger aqueous pumping systems, for example, in automobiles and to compositions which can be added to such aqueous systems (e. g., in automobile radiators) to effect such improvement.

One of the objects of the invention is to provide a new and improved method for treating aqueous liquids in heat exchangers.

Another object of the invention is to provide a corrosion inhibiting composition which performs satisfactorily in heat exchanger systems in which an aqueous coolant is pumped by means of a water pump through the system.

Another object of the invention is to provide a new and improved lubricating corrosion inhibiting composition which is suitable for use in automobile radiators wherein the coolant is water or water mixed with a water miscible organic antifreeze material as, for example, methyl alcohol, ethyl alcohol, ethylene glycol or the like. Other objects will appear hereinafter.

These objects are accomplished in accordance with the invention by dissolving in aqueous heat exchanger liquids a compound from the class consisting of hydrophilic polyoxyalkylene diols, their aliphatic monoethers, aliphatic diethers and aliphatic mono- and diamine derivatives.

In general, the compositions which are employed for the purpose of the invention may be described as polyoxyalkylene diols characterized by polyoxyalkylene chains containing all oxyethylene groups or heteric oxyethylene and oxy-1,2-propylene groups therein and having an average molecular weight such that the portion thereof attributable to oxyalkylene groups is at least 500 where both oxyethylene and oxy-1,2-propylene groups are present and at least 6000 where the oxyalkylene groups are all oxyethylene, and the aliphatic monoethers, the aliphatic diethers and the aliphatic amine derivatives of said diols. Where the composition employed is "heteric" the ratio of 1,2-propylene oxide to ethylene oxide should not exceed 9:1. The molecular weights of the preferred compounds employed for the purpose of the invention are within the range of 1000 to 10,000.

Heteric polyoxyalkylene diols which are suitable for the practice of the invention are described in Toussaint et al., U. S. 2,425,845. Monoethers of heteric polyoxyalkylene diols which are suitable for the purpose of the invention are described in Roberts et al., U. S. 2,445,755. Diethers of heteric polyoxyalkylene diols suitable for the purpose of the invention are described in Roberts et al., U. S. 2,520,611. Aliphatic amine derivatives of polyoxyalkylene diols suitable for the practice of the invention are obtained by reacting ethylene oxide or mixtures of ethylene oxide and 1,2-propylene oxide with primary and secondary amines.

The preparation of amine derivatives of alkylene oxides has been described by Horne and Shriner (J. A. C. S. 54, 2925 (1932)) who passed ethylene oxide into a mixture of diethyl amine dissolved in methanol. Although the chief product of the reaction was diethylaminoethanol, the authors state that higher molecular weight compounds were also obtained. Headlee et al. (J. A. C. S. 55, 1066 (1933)) continued this work and found that the yield of polymeric material could be increased by using an autoclave and higher molar ratios of ethylene oxide to amine. Schwoegler, U. S. 2,337,004 and 2,373,199, disclosed the preparation of amine derivatives by heating an aliphatic primary or secondary amine with an equivalent amount of anhydrous alkylene oxide or by using a high ratio of amine to oxide (15:1) at 1600 pounds per square inch. German Patent 667,744 discloses the heating of one mol of primary or secondary aliphatic amines with 12 mols of alkylene oxide in the presence of a small amount of caustic alkali.

In practice, the polyalkylene derivatives previously described are preferably incorporated with corrosion inhibiting components either in a liquid concentrate or in dry appearing or powdered form. The resultant lubricating corrosion inhibiting composition is employed as an additive for aqueous heat exchanger liquids.

The following examples are given to illustrate specifically the polyoxyalkylene derivatives which have been employed satisfactorily in the practice of the invention.

EXAMPLE I

The polyoxyalkylene glycol with an ethylene oxide to 1,2-propylene oxide ratio of 1:9 having a viscosity of 506 S. U. S. (Saybolt Universal seconds) at 100 degrees F. (Ucon 10 HDG–506, Carbide and Carbon Chemicals Corporation).

EXAMPLE II

A polyoxyalkylene glycol with an ethylene oxide to 1,2-propylene oxide ratio of 1:3 having a viscosity of 510 S. U. S. at 100 degrees F. (Ucon 25 HDG–510).

EXAMPLE III

A polyoxyalkylene glycol with an ethylene oxide to 1,2-propylene oxide ratio of 1:3 having a viscosity of 2000 S. U. S. at 100 degrees F. (Ucon 25 H–2000).

EXAMPLE IV

A polyoxyalkylene glycol with an ethylene oxide to 1,2-propylene oxide ratio of 2:3 having a viscosity of 499 S. U. S. at 100 degrees F. (Ucon 40 HDG–499).

EXAMPLE V

A polyoxyalkylene glycol with an ethylene oxide to 1,2-propylene oxide ratio of 1:1 and one terminal dibutylamine group, having a viscosity of 588 S. U. S. at 100 degrees F. (Ucon 50 HDBA–588). This compound was prepared by reacting an equimolar mixture of ethylene oxide and 1,2-propylene oxide with dibutylamine.

EXAMPLE VI

The monobutyl ether of a polyoxyalkylene glycol having an ethylene oxide to 1,2-propylene oxide ratio of 1:1 and having a viscosity of 55 S. U. S. at 100 degrees F. (Ucon 50 HB–55).

EXAMPLE VII

The monotetradecyl ether of a polyoxyalkylene glycol having an ethylene oxide to 1,2-propylene oxide ratio of 1:1 and having a viscosity of 761 S. U. S. at 100 degrees F. (Ucon 50 HTD–761).

EXAMPLE VIII

The monomethyl ether of a polyoxyalkylene glycol having an ethylene oxide to 1,2-propylene oxide ratio of 1:1 and having a viscosity of 1277 S. U. S. at 100 degrees F. (Ucon 50 HM–1277).

EXAMPLE IX

The monobutyl ether of a polyoxyalkylene glycol having an ethylene oxide to 1,2-propylene oxide ratio of 1:1, and having a viscosity of 5100 S. U. S. at 100 degrees F. (Ucon 50 HB–5100).

EXAMPLE X

The dibutyl amine of a polyoxyalkylene glycol having an ethylene oxide to 1,2-propylene oxide ratio of 1:1, and having a viscosity of 607 S. U. S. at 100 degrees F. (Ucon 50 HBA–607).

In Examples V and X the butylamine and dibutylamine employed in making the respective compositions may be replaced by other aliphatic amines as, for example, ethylamine and diethylamine, propylamine and dipropylamine, amylamine and diamylamine and their higher homologues.

The temperature at which the foregoing compositions precipitated from solutions containing 1% by weight of the respective lubricants dissolved in water was determined by heating such solutions on a steam bath with stirring until it became cloudy. The following table illustrates the results:

Table

| Compound, Class and Viscosity | Precipitation Point in °C. |
|---|---|
| Ucon 10 HDG–506 | 38 |
| Ucon 25 HDG–510 | 49 |
| Ucon 25 H–2000 | 37 |
| Ucon 40 HDG–499 | 75 |
| Ucon 50 HDBA–588 | 44 |
| Ucon 50 HBA–607 | 69 |
| Ucon 50 HB–55 | 69–70 |
| Ucon 50 HTD–761 | 48 |
| Ucon 50 HM–1277 | 59 |
| Ucon 50 HB–5100 | 65 |

It will be understood that the invention does not contemplate the employment of polyoxyalkylene derivatives which have a precipitation point from a 1% by weight aqueous solution higher than 90 degrees C. because in this case the said derivative does not function properly for the intended purpose. Thus, the composition known as Ucon 75 H–1400 has a precipitation point above 100 degrees C. and is unsatisfactory for the purpose of the invention. The polyoxypropylene glycols, e. g., Ucon LB–135, are unsatisfactory for the purpose of the invention because their 1% by weight aqueous solutions are insoluble even at temperatures below 45 degrees C.

The most effective polyoxyalkylene derivatives for the purpose of the invention are the monoether derivatives of polyoxyalkylene glycols such as described in U. S. 2,425,755, wherein the ratio of ethylene oxide to 1,2-propylene oxide is approximately 2/3 to 1½ parts of propylene oxide for each part of ethylene oxide by weight.

The corrosion inhibiting components employed for the purpose of the invention are not limited to any specific type of corrosion inhibitor so long as the inhibitor is soluble in water and has corrosion inhibiting properties so as to be effective in inhibiting corrosion of iron, steel, copper and/or aluminum or other metals employed in the construction of heat exchangers.

The following example illustrates the preparation of a corrosion inhibiting lubricating composition which has proven to be very effective in actual use but it will be understood that the invention in its broader aspects is not limited to this specific composition.

EXAMPLE XI

The following ingredients were mixed together with sufficient water to make 350 gallons of solution:

320 lbs. mercaptobenzothiazole
225 lbs. 50% sodium hydroxide
60.6 lbs. J M brand 42 degrees Bé. sodium silicate
307 lbs. sodium phosphite or sodium nitrite The above composition was then mixed with 352 lbs. of monobutylether of a polyoxyalkylene glycol consisting of ethylene oxide and 1,2-propylene oxide in approximately equal weight proportions and having a molecular weight of approximately 5000 (50 HB–5100). To this mixture was also added 70.4 pounds of a polyoxypropylene glycol (P–750 Dow Chemical Company).

The resultant mixture consists of approximately 400 gallons of a lubricating corrosion inhibiting composition or a sufficient amount to make 6400 8-ounce cans. One 8-ounce can of this composition is sufficient to protect the ordinary automobile radiator of 12 to 20 quart capacity against corrosion over a long period of time. The length of the period of protection will depend, of course, upon whether additional water or other corrosive liquids are added to the radiator, it being understood that additional quantities of the lubricating corrosion inhibiting composition should be added to make up for losses when the radiator is drained or partially drained.

In the composition which was illustrated by the foregoing example, the sodium hydroxide was added to dissolve the mercaptobenzothiazol. The other components act as specific inhibitors for various types of corrosion. The polyoxypropylene glycol was employed as an antifoam additive.

Instead of the 50 HB–5100 described in Example XI any of the polyoxyalkylene derivatives of Examples I to VIII and X may be substituted in substantially the same quantities.

In the concentrate as described in Example XI the polyoxyalkylene derivative will usually constitute 5 to 15% by weight of the composition. However, when the composition is added to an automobile radiator it is normally diluted 40 to 80 times.

EXAMPLE XII

A powdered lubricating corrosion inhibiting composition was prepared by mixing together:

| | Percent by weight |
|---|---|
| Mercaptobenzothiazole | 27 |
| Soda ash | 32 |
| Sodium nitrite | 14.5 |
| Sodium metasilicate crystalline | 4 |
| Carbowax 6000 or 10,000 | 22.5 |

About 4 oz. of this composition are added to the radiator of the average automobile of 12 to 20 quart capacity.

It will be recognized that powdered compositions have some advantages over liquid compositions in packaging and handling.

The concentration of lubricant in the heat exchange liquid normally will be within the range of 0.05 to 1% by weight.

The invention provides new and useful advantages in aqueous heat exchanger liquids, particularly in eliminating squeaking in water pumps for such heat exchanger liquids and in providing means for carrying a corrosion inhibitor to all parts of a heat exchanger system. Rubber hoses such as are used in automobiles to circulate heat exchanger liquids are not deteriorated or otherwise adversely affected by the compositions employed for the purpose of the invention.

The invention is hereby claimed as follows:

1. A process of heat-exchange which comprises circulating water in a heat exchange system by means of a pump, said water containing a minor amount of at least 0.05% but not exceeding about 1% by weight of a compound from the group consisting of polyoxyalkylene diols, their aliphatic monoethers, aliphatic diethers, and aliphatic mono- and diamine derivatives which dissolve in water to form at least 1% by weight aqueous solutions at temperatures not exceeding 45 degrees C. and begin to precipitate from such solutions at temperatures not exceeding 90 degrees C., the oxyalkylene groups in said compounds being from the group consisting of oxyethylene and heteric oxyethylene-oxy 1,2-propylene in which the weight ratio of 1,2-propylene oxide to ethylene oxide does not exceed 9:1, the molecular weight of said compounds being at least 6000 where the oxyalkylene groups are all oxyethylene and at least 500 where the oxyalkylene groups are both oxyethylene and oxy 1,2-propylene.

2. A process of heat-exchange which comprises circulating water in a heat exchange system by means of a pump, said water containing a minor amount of at least 0.05% but not exceeding about 1% by weight of a polyoxyalkylene diol, which dissolves in water to form at least 1% by weight aqueous solutions at temperatures not exceeding 45 degrees C. and begins to precipitate from such solutions at temperatures not exceeding 90 degrees C., the oxyalkylene groups in said compound being from the group consisting of oxyethylene and heteric oxyethylene-oxy 1,2-propylene in which the weight ratio of 1,2-propylene oxide to ethylene oxide does not exceed 9:1, the molecular weight of said compounds being at least 6000 where the oxyalkylene groups are all oxyethylene and at least 500 where the oxyalkylene groups are both oxyethylene and oxy 1,2-propylene.

3. A process of heat-exchange which comprises circulating water in a heat exchange system by means of a pump, said water containing a minor amount of at least 0.05% but not exceeding about 1% by weight of aliphatic monoethers of polyoxyalkylene diols which dissolve in water to form at least 1% by weight aqueous solutions at temperatures not exceeding 45 degrees C. and begin to precipitate from such solutions at temperatures not exceeding 90 degrees C., the oxyalkylene groups in said compounds being from the group consisting of oxyethylene and heteric oxyethylene-oxy 1,2-propylene in which the weight ratio of 1,2-propylene oxide to ethylene oxide does not exceed 9:1, the molecular weight of said compounds being at least 6000 where the oxyalkylene groups are all oxyethylene and at least 500 where the oxyalkylene groups are both oxyethylene and oxy 1,2-propylene.

4. A process of heat-exchange which comprises circulating water in a heat exchange system by means of a pump, said water containing a minor amount of at least 0.05% but not exceeding about 1% by weight of aliphatic diethers of polyoxyalkylene diols which dissolve in water to form at least 1% by weight aqueous solutions at temperatures not exceeding 45 degrees C. and begin to precipitate from such solutions at temperatures not exceeding 90 degrees C., the oxyalkylene groups in said compounds being from the group consisting of oxyethylene and heteric oxyethylene-oxy 1,2-propylene in which the weight ratio of 1,2-propylene oxide to ethylene oxide does not exceed 9:1, the molecular weight of said compounds being at least 6000 where the oxyalkylene groups are all oxyethylene and at least 500 where the oxyalkylene groups are both oxyethylene and oxy 1,2-propylene.

5. A process of heat-exchange which comprises circulating water in a heat exchange system by means of a pump, said water containing a minor amount of at least 0.05% but not exceeding about 1% by weight of mono aliphatic amines of polyoxyalkylene diols which dissolve in water to form at least 1% by weight aqueous solutions at temperatures not exceeding 45 degrees C. and begin to precipitate from such solutions at temperatures not exceeding 90 degrees C., the oxyalkylene groups in said compounds being from the group consisting of oxyethylene and heteric oxyethylene-oxy 1,2-propylene in which the weight ratio of 1,2-propylene oxide to ethylene oxide does not exceed 9:1, the molecular weight of said compounds being at least 6000 where the oxyalkylene groups are all oxyethylene and at least 500 where the oxyalkylene groups are both oxyethylene and oxy 1,2-propylene.

6. A process of heat-exchange which comprises circulating water in a heat exchange system by means of a pump, said water containing a minor amount of at least 0.05% but not exceeding about 1% by weight of di-aliphatic amines of polyoxyalkylene diols which dissolve in water to form at least 1% by weight aqueous solutions at temperatures not exceeding 45 degrees C. and begin to precipitate from such solutions at temperatures not exceeding 90 degrees C., the oxyalkylene groups in said compounds being from the group consisting of oxyethylene and heteric oxyethylene-oxy 1,2-propylene in which the weight ratio of 1,2-propylene oxide to ethylene oxide does not exceed 9:1, the molecular weight of said compounds being at least 6000 where the oxyalkylene groups are all oxyethylene and at least 500 where the oxyalkylene groups are both oxyethylene and oxy 1,2-propylene.

7. A process of heat-exchange which comprises circulating water in a heat exchange system by means of a pump, said water containing a minor amount of at least 0.05% but not exceeding about 1% by weight of an aliphatic monoether of a polyoxyalkylene glycol wherein the oxyalkylene groups consist of ethylene oxide and 1,2-propylene oxide in approximately equal parts by weight and the molecular weight is at least 1000 and further characterized by the property that 1% by weight thereof will dissolve in water at temperatures not higher than 45 degrees C. and will begin to precipitate at temperatures not higher than 90 degrees C.

8. A process of heat-exchange which comprises circulating water in a heat exchange system by means of a pump, said water containing a minor amount of at least 0.05% but not exceeding about 1% by weight of an aliphatic monoether of a polyoxyethylene glycol having a molecular weight of at least 6000 and further characterized by the property that 1% by weight thereof will dissolve in water at temperatures not higher than 45 degrees C. and will begin to precipitate at temperatures not higher than 90 degrees C.

References Cited in the file of this patent

UNITED STATES PATENTS

| | | |
|---|---|---|
| 2,337,004 | Schwoegler | Dec. 14, 1943 |
| 2,384,553 | Kiffer | Sept. 11, 1945 |
| 2,425,755 | Roberts et al. | Aug. 19, 1947 |
| 2,425,845 | Toussaint et al. | Aug. 19, 1947 |
| 2,462,694 | Walker | Feb. 22, 1949 |
| 2,520,611 | Roberts et al. | Aug. 29, 1950 |

OTHER REFERENCES

Russ: "Properties and Uses of Some New Synthetic Lubricants," in Lubrication Engineering, December 1946, pages 151–157.

Petroleum Refiner, vol. 25, No. 2, February 1946, page 138.